United States Patent
Judkins et al.

(10) Patent No.: US 12,230,230 B2
(45) Date of Patent: Feb. 18, 2025

(54) SYSTEMS AND METHODS OF FAULT DETECTION FOR INPUT/OUTPUT MODULES OF INDUSTRIAL SYSTEMS

(71) Applicant: ROCKWELL AUTOMATION TECHNOLOGIES, INC., Mayfield Heights, OH (US)

(72) Inventors: Daniel D. Judkins, Richmond Heights, OH (US); Christopher D. Woggon, Mayfield Heights, OH (US); Alex W. Stephens, Painesville, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 18/319,952

(22) Filed: May 18, 2023

(65) Prior Publication Data

US 2024/0161713 A1    May 16, 2024

Related U.S. Application Data

(60) Provisional application No. 63/425,582, filed on Nov. 15, 2022.

(51) Int. Cl.
　　*G09G 5/00*　　　(2006.01)
　　*G05B 23/02*　　(2006.01)
　　*G06F 3/14*　　　(2006.01)

(52) U.S. Cl.
　　CPC ......... *G09G 5/006* (2013.01); *G05B 23/0275* (2013.01); *G06F 3/14* (2013.01); *G09G 2330/021* (2013.01); *G09G 2330/08* (2013.01); *G09G 2330/12* (2013.01); *G09G 2354/00* (2013.01)

(58) Field of Classification Search
　　None
　　See application file for complete search history.

(56) References Cited

U.S. PATENT DOCUMENTS

| | | |
|---|---|---|
| 5,036,452 A | 7/1991 | Loftus |
| 6,411,119 B1 | 6/2002 | Feldtkeller |
| 7,652,393 B2 | 1/2010 | Moth |
| 8,772,964 B2 | 7/2014 | Beg et al. |

(Continued)

FOREIGN PATENT DOCUMENTS

| | | |
|---|---|---|
| CN | 110879565 A | 3/2020 |
| DE | 19814097 C1 | 3/2000 |
| GB | 2567650 B | 4/2019 |

OTHER PUBLICATIONS

Extended European Search Report for Application No. 22205345.6 mailed Apr. 5, 2023, 10 pages.

(Continued)

*Primary Examiner* — Duane N Taylor, Jr.
(74) *Attorney, Agent, or Firm* — Quarles & Brady LLP

(57) ABSTRACT

Systems and methods for providing fault detection for input/output modules of industrial systems. One system includes a plurality of channel circuits for interfacing with industrial control equipment of an industrial system. The system also includes an electronic processor communicatively coupled to each channel circuit via a dedicated hardware communication channel. The electronic processor is configured to control a current load supply for at least one channel circuit included in the plurality of channel circuits.

18 Claims, 9 Drawing Sheets

(56) References Cited

U.S. PATENT DOCUMENTS

| | | |
|---|---|---|
| 9,093,860 B2 | 7/2015 | Beg |
| 9,172,271 B2 | 10/2015 | Beg et al. |
| 9,594,097 B2 | 3/2017 | Bogner et al. |
| 9,735,692 B1 | 8/2017 | Lu et al. |
| 10,082,856 B1 | 9/2018 | Owen et al. |
| 10,631,426 B1 | 4/2020 | Lostoski et al. |
| 10,684,611 B2 | 6/2020 | O'Connell et al. |
| 10,838,386 B1 | 11/2020 | Wrobel et al. |
| 10,886,776 B1 | 1/2021 | Dias |
| 10,985,477 B1 | 4/2021 | Wrobel et al. |
| 10,986,748 B1 | 4/2021 | Wrobel et al. |
| 2003/0204777 A1 | 10/2003 | Kojori |
| 2010/0007216 A1 | 1/2010 | Chojecki et al. |
| 2011/0184579 A1 | 7/2011 | Nilsen et al. |
| 2012/0098338 A1 | 4/2012 | Lew et al. |
| 2013/0138365 A1 | 5/2013 | Etaati et al. |
| 2015/0331468 A1 | 11/2015 | Jau et al. |
| 2017/0170733 A1 | 6/2017 | Ferencz et al. |
| 2017/0220089 A1 | 8/2017 | Mathew et al. |
| 2018/0052503 A1 | 2/2018 | Sharma et al. |
| 2018/0252777 A1 | 9/2018 | Straub |
| 2018/0292801 A1 | 10/2018 | Tonet |
| 2018/0351547 A1 | 12/2018 | Chawla |
| 2019/0121413 A1 | 4/2019 | Tsai et al. |
| 2019/0366953 A1 | 12/2019 | Gainreddy et al. |
| 2020/0119648 A1* | 4/2020 | Lee .................. H02M 1/08 |
| 2020/0303922 A1 | 9/2020 | Fukuhara et al. |
| 2022/0376486 A1* | 11/2022 | Wortberg ........... H03K 17/0822 |
| 2022/0376608 A1 | 11/2022 | Goodson, II et al. |
| 2023/0015527 A1 | 1/2023 | Zipf |
| 2023/0065352 A1 | 3/2023 | O'Connell et al. |
| 2023/0101570 A1 | 3/2023 | Denning et al. |
| 2023/0101752 A1 | 3/2023 | Denning et al. |
| 2023/0136454 A1 | 5/2023 | O'Connell |

OTHER PUBLICATIONS

Extended European Search Report for Application No. 22198001.4 mailed Feb. 21, 2023, 10 pages.

Extended European Search Report for Application No. 22198006.3 mailed Feb. 10, 2023, 12 pages.

Extended European Search Report for Application No. 22189913.1 mailed Feb. 20, 2023, 8 pages.

Patoka, M., "Fundamentals of power system ORing," EETimes, https://www.eetimes.com/fundamentals-of-power-system-oring/, published Mar. 21, 2007, 6 pages.

* cited by examiner

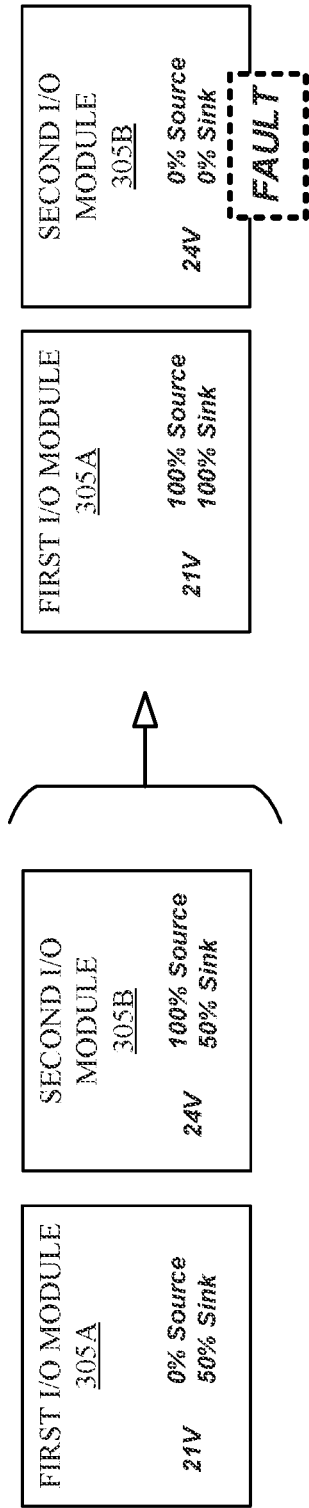

SYSTEMS AND METHODS OF FAULT DETECTION FOR INPUT/OUTPUT MODULES OF INDUSTRIAL SYSTEMS

CROSS-REFERENCES TO RELATED APPLICATIONS

This application claims priority to U.S. Provisional Application No. 63/425,582, filed on Nov. 15, 2022, the entire contents of which is incorporated herein by reference.

BACKGROUND

Industrial controllers are specialized computer systems used for the control of industrial processes or machinery, for example, in a factory environment. Generally, an industrial controller executes a stored control program that reads inputs from a variety of sensors associated with the controlled process and machine, and sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, the controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, ControlNet or EtherNet/IP) differ from standard communication networks (such as Ethernet) by guaranteeing maximum communication delays by pre-scheduling the communication capacity of the network, providing redundant communication capabilities for high availability, and the like.

As part of their enhanced modularity, industrial controllers may employ input/output ("I/O") modules or devices. Each of these I/O modules or devices may have a connector system allowing them to be installed in different combinations in a housing or rack along with other selected I/O modules or devices to match the demands of the particular application or industrial system. Multiple or individual I/O modules or devices may be located at convenient control points near the controlled process or machine to communicate with a central industrial controller via the control network.

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to providing fault detection for I/O modules of industrial systems.

The configurations described herein provide for the ability to power circuitry on and off for a specific I/O channel on demand. The technology disclosed herein may be implemented on a hardware setup where individual channels of an I/O device are electrically isolated (via individual dedicated hardware channels).

Current steering is a feature available for configurations described herein, such as, e.g., duplex operations of I/O modules. In a duplex operation, an I/O module and its redundant partner I/O module can share a current load. For instance, a current load may be shared between two redundant devices (e.g., a first I/O module and a second I/O module). Such current steering functionality may be enabled by embedded software or other programmable coding. Alternatively, or in addition, embedded software or other programmable coding can detect fault scenarios, such as, e.g., when one I/O module output is not balanced between a pair of I/O modules. Since configurations described herein allow the channel power loading to be split (or shared) across a pair of I/O modules, embedded software can calculate the readback readings and determine if the balance between the pair of modules is out of tolerance.

The configurations described herein may target the uptime of a high availability fault tolerant I/O product. For instance, configurations described herein may add new detection of fault scenarios of hardware and embedded software. When fault scenarios are detected, an appropriate action can be performed (e.g., by the user) in a manner that does not bring the overall system down for repairs.

Current steering may provide a capability for redundant I/O modules to share a current load between the I/O modules. Embedded software may make the determination of which module is responsible for which load at a specific time. The timing of the change to certain current levels as well as the current level themselves may be subject to diagnostics.

Overall, diagnostics in highly available automation systems may permit software to detect faults and attempt a recovery internal to the software or hardware, put the automation system in a safe state, alert a user to a needed repair, or the like.

In a highly available fault tolerant system, redundancy may reduce the unhandled failure rate of an I/O module. The configurations described herein provide for the concurrent operation of I/O modules in a duplex configuration. This improves the response of putting the automation system in a safe state and alerting the user to a needed repair, where the safe state may still an operational state in the system, not specifically an idle state.

The following example scenarios describe the diagnostic type and the benefit to the end user. A first example scenario involves power balancing and imbalance detection (e.g., fault detection). According to this scenario, having a redundant partner I/O analog output module means that the embedded software can perform load balancing between I/O modules. In such configurations, the output power may be set for each I/O module such that a sum of the power on a screw terminal is the same (or substantially similar) as a commanded output.

The embedded software can also perform a diagnostic that checks the imbalance balance between partnered I/O modules. Some configurations described herein may ensure that the power settings for both I/O modules are within tolerance. This can detect both hardware and software faults. As one example, when a first I/O module output channel is supposed to measure 40% of a commanded current and a second I/O module measures 60%, and when the first I/O module output channel divided by the second I/O module channel is not 1.5+/− tolerance, a fault may have occurred. Since this imbalance cannot detect which module is at fault, a safe state would be ramping down the power on both I/O modules and waiting for a user to repair the circuit.

A second example scenario involves timing of current loading. In this example scenario, when a current load is commanded to an I/O module, the transition from the present loading value to the new commanded value may be executed within a specific time. When the firmware maintains a high enough resolution measurement of time, the firmware can measure readback current values to detect the transitions of the power level. When either the ramp rate of the power or the calculated balance of power is off, then the embedded software can command one or the other redundant module to a safe state.

Accordingly, configurations described herein provide systems and methods for providing fault detection for I/O modules of industrial systems. One configuration provides a system. The system can include a first input/output ("I/O") module including a first channel circuit for interfacing with industrial control equipment of an industrial system. The system can also include a second I/O module including a second channel circuit for interfacing with the industrial control equipment of the industrial system. The system can also include an electronic processor. The electronic processor can control sourcing of power to the industrial control equipment of the industrial system via at least one of the first I/O module or the second I/O module.

Another configuration provides a method. The method can include receiving current load data associated with a set of redundant I/O modules, the set of redundant I/O modules including a first redundant I/O module having a first channel circuit and a second redundant I/O module having a second channel circuit. The method can also include determining a current load imbalance between the first channel circuit and the second channel circuit based on the current load data. The method can also include controlling a current load supply to at least one of the redundant I/O modules of the set of redundant I/O modules.

Yet another configuration provides a system. The system can include a plurality of channel circuits for interfacing with industrial control equipment of an industrial system. The system can also include an electronic processor communicatively coupled to each channel circuit via a dedicated hardware communication channel, the electronic processor can control a current load supply to the plurality of channel circuits.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

FIGS. 6A-6B illustrate example fault scenarios according to some configurations.

DETAILED DESCRIPTION

Figure 1:
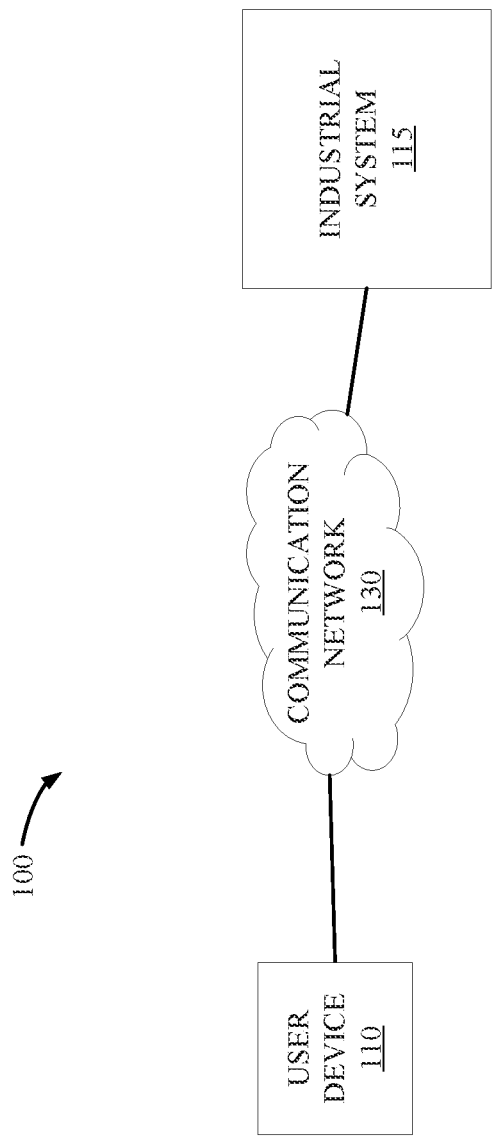
FIG. 1 schematically illustrates a system for providing fault detection for I/O modules of industrial systems in accordance with some configurations.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

FIG. 1 schematically illustrates a system 100 for providing fault detection for I/O modules according to some configurations. In the illustrated example, the system 100 may include a user device 110 and an industrial system 115. In some configurations, the system 100 includes fewer, additional, or different components in different configurations than illustrated in FIG. 1. As one example, the system 100 may include multiple user devices 110, multiple industrial systems 115, or a combination thereof. As another example, one or more components of the system 100 may be combined into a single device. Alternatively, or in addition, in some configurations, the user device 110 may be included as part of the industrial system 115 (e.g., as a component of the industrial system 115).

The user device 110 and the industrial system 115 may communicate over one or more wired or wireless communication networks 130. Portions of the communication networks 130 may be implemented using a wide area network, such as the Internet, a local area network, such as a BLUETOOTH® or WI-FIC), and combinations or derivatives thereof. Alternatively, or in addition, in some configurations, components of the system 100 may communicate directly as compared to through the communication network 130. Also, in some configurations, the components of the system 100 may communicate through one or more intermediary devices not illustrated in FIG. 1.

Figure 2:
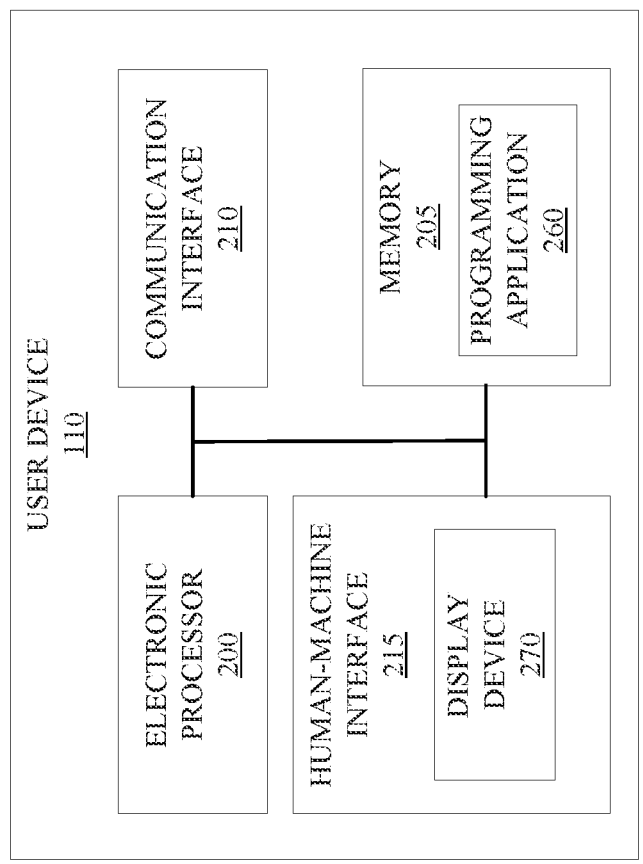
FIG. 2 schematically illustrates an example user device of the system of FIG. 1 according to some configurations.

The user device 110 may be a computing device, such as a desktop computer, a laptop computer, a tablet computer, a terminal, a smart telephone, a smart television, a smart wearable, or another suitable computing device that interfaces with a user. As illustrated in FIG. 2, the user device 110 includes an electronic processor 200, a memory 205, a communication interface 210, and a human-machine interface ("HMI") 215. The electronic processor 200, the memory 205, the communication interface 210, and the HMI 215 communicate wirelessly, over one or more communication lines or buses, or a combination thereof. The user device 110 may include additional components than those illustrated in FIG. 2 in various configurations. The user device 110 may also perform additional functionality other than the functionality described herein. Also, the functionality described herein as being performed by the user device 110 may be distributed among multiple devices (e.g., as part of a cloud service or cloud-computing environment), combined with another component of the system 100 (e.g., combined with the industrial system 115 (or a component thereof)), or a combination thereof.

The communication interface 210 may include a transceiver that communicates with the industrial system 115 over the communication network 130 and, optionally, one or more other communication networks or connections. In some configurations, the communication interface 210 enables the user device 110 to communicate with the industrial system 115 over one or more wired or wireless communication networks or connections. The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to retrieve instructions and data from the memory 205 and execute the instructions.

As one non-limiting example, as illustrated in FIG. 2, the memory 205 includes a programing application 260 (referred to herein as "the application 260"). The application 260 is a software application executable by the electronic processor 200 in the example illustrated and as specifically discussed below, although a similarly purposed module can be implemented in other ways in other examples. The electronic processor 200 executes the application 260 to facilitate user programming for industrial devices or controllers, such as, e.g., a fault detection response protocol, a ladder logic program for fault handling and detection, and the like. In some configurations, the electronic processor 200 executes the application 260 to facilitate reporting or alerting a user to a fault scenario detected with respect to the industrial system 115 (or component thereof), as described in greater detail herein.

As noted above, in some configurations, the functionality (or a portion thereof) described herein as being performed by the user device 110 may be distributed among multiple devices (e.g., as part of a cloud service or cloud-computing environment). As one example, in some configurations, the system 100 may include a server (e.g., a computing device).

The server may include similar components as the user device 110, such as an electronic processor (e.g., a microprocessor, an ASIC, or another suitable electronic device), a memory (e.g., a non-transitory, computer-readable storage medium), a communication interface, such as a transceiver, for communicating over the communication network 130 and, optionally, one or more additional communication networks or connections. Accordingly, in some embodiments, the server may store the application 260 as part of providing a programming service, a fault detection and reporting service, or a combination thereof through the server. In such configurations, to communicate with the server (e.g., interact with the application 260), the user device 110 may store a browser application or a dedicated software application executable by the electronic processor 200.

As noted above, the user device 110 may also include the HMI 215 for interacting with a user. The HMI 215 may include one or more input devices, one or more output devices, or a combination thereof. Accordingly, in some configurations, the HMI 215 allows a user to interact with (e.g., provide input to and receive output from) the user device 110. For example, the HMI 215 may include a keyboard, a cursor-control device (e.g., a mouse), a touch screen, a scroll ball, a mechanical button, a display device (e.g., a liquid crystal display ("LCD")), a printer, a speaker, a microphone, or a combination thereof. As illustrated in FIG. 2, in some configurations, the HMI 215 may include a display device 270. The display device 270 may be included in the same housing as the user device 110 or may communicate with the user device 110 over one or more wired or wireless communication networks or connections. For example, in some configurations, the display device 270 is a touchscreen included in a laptop computer or a tablet computer. In other configurations, the display device 270 is a monitor, a television, or a projector coupled to a terminal, desktop computer, or the like via one or more cables.

Figure 3:
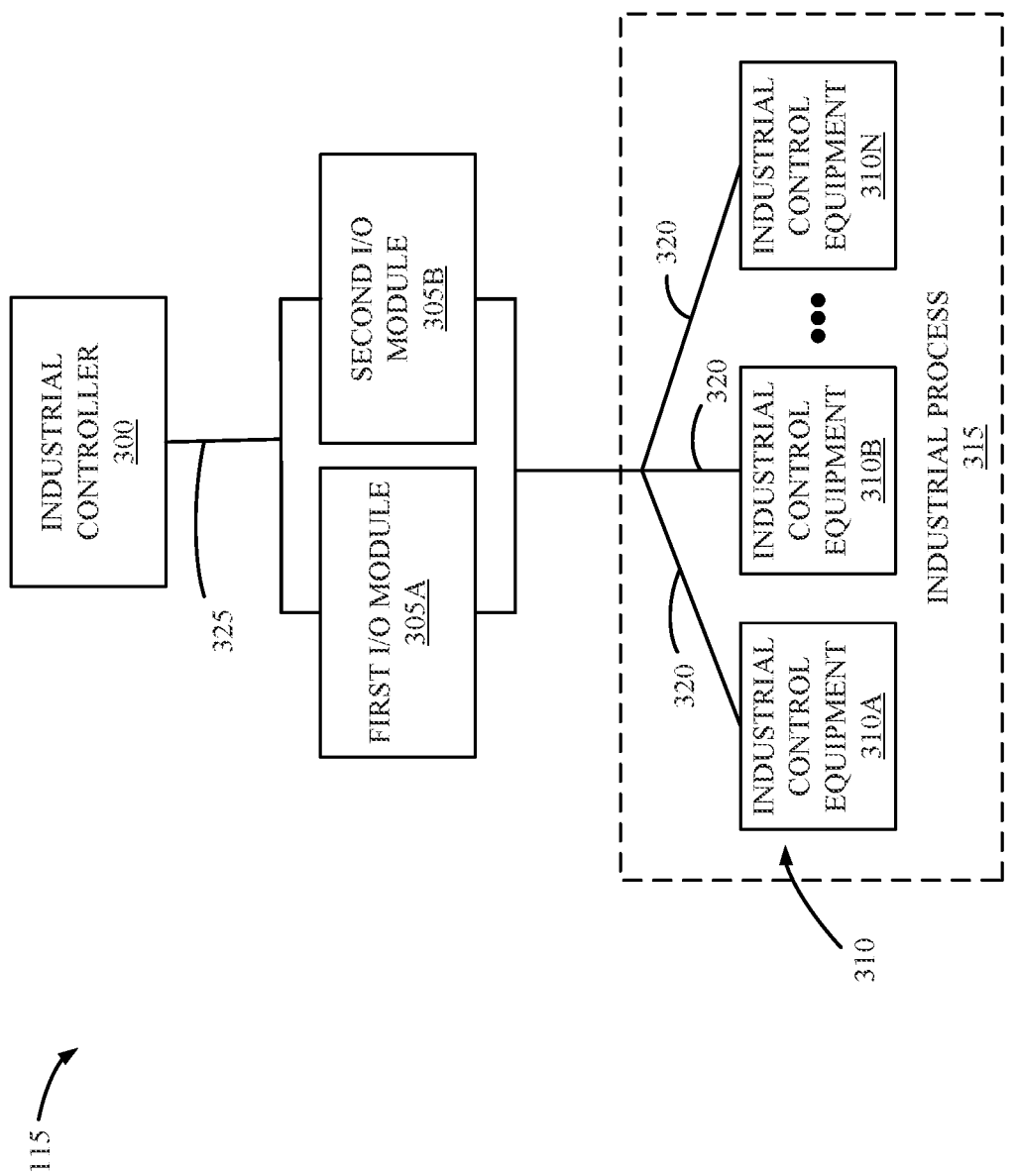
FIG. 3 schematically illustrates an example industrial system of the system of FIG. 1 according to some configurations.

FIG. 3 schematically illustrates an example of the industrial system 115 according to some configurations. In the illustrated example of FIG. 3, the industrial system 115 may include an industrial controller 300, one or more I/O modules 305 (referred to herein collectively as "the I/O modules 305" and generically as "the I/O module 305"), and at least one piece of industrial control equipment 310. In some configurations, the industrial system 115 includes fewer, additional, or different components in different configurations than illustrated in FIG. 3. As one example, the industrial system 115 may include multiple industrial controllers 300, multiple I/O modules 305, or a combination thereof. For example, as illustrated in FIG. 3, in some configurations, the industrial system 115 may include a first I/O module 305A and a second I/O module 305B in a duplex configuration. As another example, one or more components of the industrial system 115 may be combined into a single device. Alternatively, or in addition, in some configurations, the user device 110 may be included as part of the industrial system 115 (e.g., as a component of the industrial system 115).

The industrial system 115 may be a manufacturing system, such as, e.g., an industrial automation system or the like. The industrial system 115 may perform one or more industrial processes, manufacturing processes, production processes, or the like (represented in FIG. 3 as an industrial process 315). In some configurations, the industrial system 115 may perform a production process that produces goods or products. As one example, the industrial system 115 may perform a vehicle manufacturing process to assemble or produce a vehicle (or various components thereof). As another example, the industrial system 115 may perform a food manufacturing process for making a food product.

The industrial controller 300, which could be a programmable logic controller ("PLC"), may store and execute a control program for the control of the industrial process 315 as is generally understood in the art. The industrial controller 300 may include similar components as the user device 110, such as an electronic processor (e.g., a microprocessor, an ASIC, or another suitable electronic device), a memory (e.g., a non-transitory, computer-readable storage medium), a communication interface, and the like. The industrial process 315, for example, may coordinate a set of machines on an assembly line or the like, or interact with actuators, sensors and/or other industrial control equipment of plant processing materials to control that process, or conduct other similar control applications (via, e.g., the industrial control equipment 310A, 310B, 310N of FIG. 3).

As illustrated in FIG. 3, the industrial controller 300 may communicate with at least one I/O module 305 providing a direct interface to the industrial control equipment 310 of the industrial process 315. In some configurations, the I/O module 305 provides input and output lines via electrical conductors 320 to and from the industrial control equipment 310 of the industrial process 315 allowing communication with (or between) the industrial control equipment 310, such as industrial control equipment 310A, 310B, and 310N. The industrial control equipment 310 may include, e.g., a digital actuator (e.g., a relay, an indicator light, a motor, or the like), a digital sensor (e.g., a photoelectric sensor, a dry contact sensor, an inductive sensor, a push button, or the like), an analog actuator (e.g., a valve, a positioner, a meter, or the like), an analog sensor (e.g., a level sensor for a tank, a temperature sensor, a position sensor, or the like), or the like.

The industrial controller 300 can communicate with the I/O module 305 through an industrial control network 325. The industrial control network 325 may include, e.g., Common Industrial Protocol ("CIP"), EtherNet/IP, DeviceNet, CompoNet, ControlNet network, or the like (e.g., a network whose specifications are published and whose protocols are used broadly by a number of manufacturers and suppliers). Such networks may provide for high reliability transmission of data in real time (or near real-time) and can provide features ensuring timely delivery (e.g., by pre-scheduling communication resources, such as network bandwidth, network buffers, and the like).

The industrial controller 300 can also communicate, through a data network (which may, but need not be, an industrial control network), with a central computer system (e.g., via one or more routers or switches). As one example, the industrial controller 300 may communicate via the communication network 130 with the user device 110, as illustrated in FIG. 1.

Figure 4:
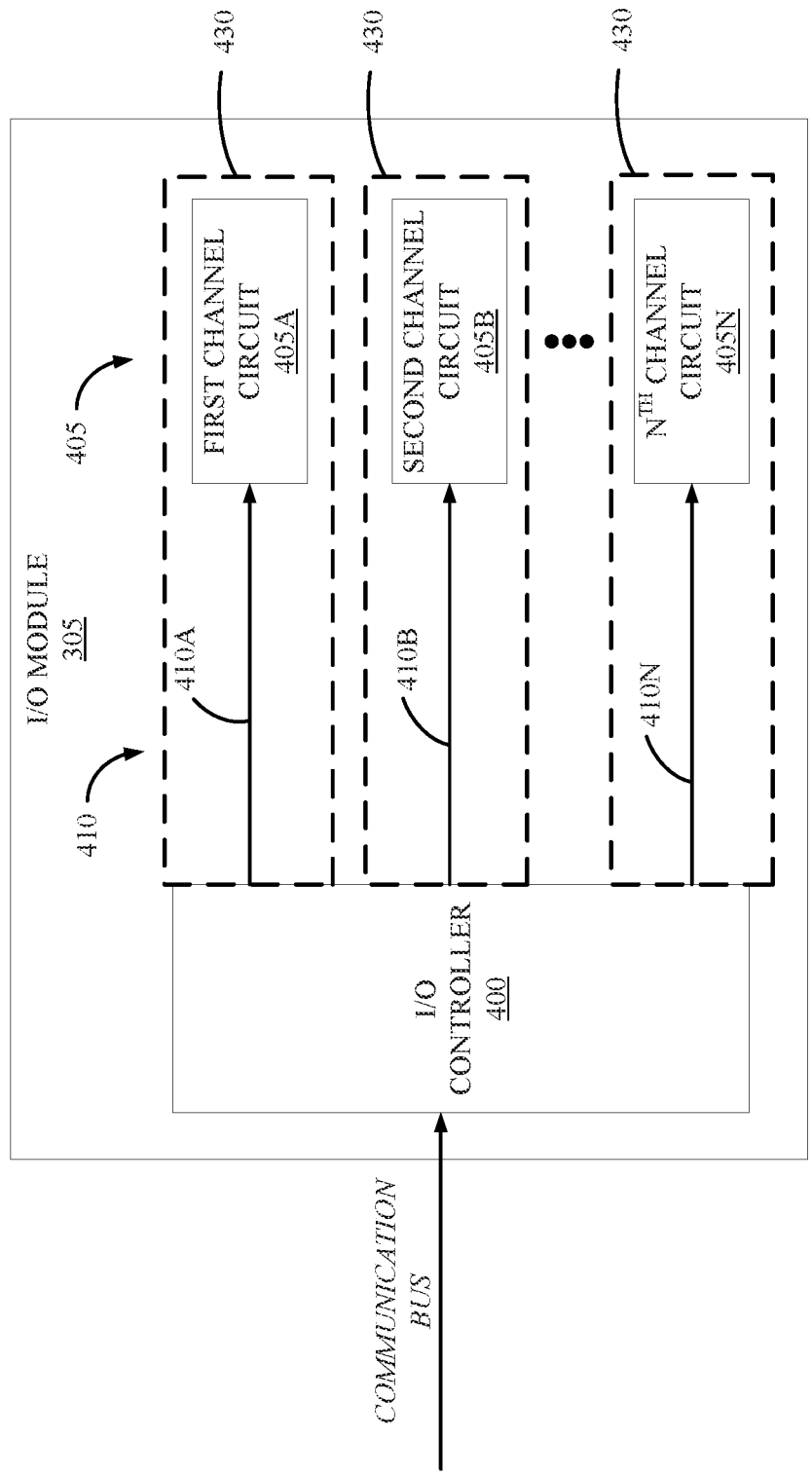
FIG. 4 schematically illustrates an example I/O module according to some configurations.

FIG. 4 schematically illustrates an example of the I/O module 305 according to some configurations. In the illustrated example, the I/O module 305 includes an I/O controller 400 and a set of channel circuits 405 (represented in FIG. 4 as a first channel circuit 405A, a second channel circuit 405B, and an $N^{th}$ channel circuit 405N). Accordingly, in some configurations, the I/O module 305 is a multichannel I/O module including a plurality of channel circuits. In some configurations, the I/O module 305 may include fewer, additional, or different components in different configurations than illustrated in FIG. 4.

In the illustrated example, the I/O controller 400 is communicatively coupled to each channel circuit 405 by a hardware communication channel 410 (e.g., a dedicated hardware communication line or channel). For instance, in some configurations, the hardware communication channel 410 is a hardware communication line. In some configurations, the hardware communication line 410 may include a serial communication interface that communicates one bit of information at a time. In some configurations, the hardware communication line 410 may communicate (or transmit) a power control signal, a set of synchronization signals (e.g., a primary synchronization signal and a secondary synchronization signal), or a combination thereof. As one example, the I/O controller 400 may use the hardware communication channel 410 to transmit or otherwise communicate a signal, such as a power control signal and a pair of synchronization signals, to the channel circuit 405. As illustrated in FIG. 4, the I/O controller 400 is coupled to the first channel circuit 405A by a first hardware communication channel 410A, the second channel circuit 405B by a second hardware communication channel 410B, and the $N^{th}$ channel circuit 405N by an $N^{th}$ hardware communication channel 410N.

Accordingly, in some configurations, each channel circuit 405 is electrically isolated from each other (via, e.g., the dedicated hardware communication channels 410 as opposed to, e.g., a shared communication channel). For instance, in some configurations, each channel circuit 405 is electrically isolated from each other via an isolation boundary or barrier (represented in FIG. 4 as a dashed box 430). In some configurations, the isolation boundary 430 for a channel circuit 405 also includes at least a portion of the corresponding hardware communication channel 410, as illustrated in FIG. 4. As one example, the first channel circuit 405A is electrically isolated from the second channel circuit 405B and the $N^{th}$ channel circuit 405N, the second channel circuit 405B is electrically isolated from the first channel circuit 405A and the $N^{th}$ channel circuit 405N, and the $N^{th}$ channel circuit 405N is electrically isolated from the first channel circuit 405A and the second channel circuit 405B. Accordingly, in some configurations, the I/O module 305 is implemented via a hardware design or setup where individual channels of the I/O module 305 are electrically isolated, such that, e.g., in some configurations, at least one of the channel circuits 405 cannot cause interference with other circuits (e.g., another channel circuit 405) outside of the isolation boundary 430, unless through dedicated interfaces for communicating across the isolation boundary 430 (e.g., a dedicated hardware communication channel 410). Alternatively, or in addition, in some configurations the I/O module 305 is implemented via a hardware design or setup where individual channels of the I/O module 305 are electrically isolated such that, e.g., in some configurations, each of the channel circuits 405 are independently controlled. As one example, in such configurations, independent control may be provided via sequencing specific voltage rails up or down independently. In such configurations, the channel circuits 405 may share some common components (e.g., ground). Accordingly, in some configurations, the I/O module 305 may implement multiple power domains. The electrical isolation as described herein provides independence of power control.

The I/O controller 400 may control a power state of each channel circuit 405 included in the I/O module 305. A power state may include a power-off state (e.g., a disabled state where no power is provided or received), a power-on state (e.g., an enabled state where power is provided or received), or the like. Accordingly, a power state of a channel circuit 405 may represent whether the channel circuit 405 receives power (or is active).

Figure 5:
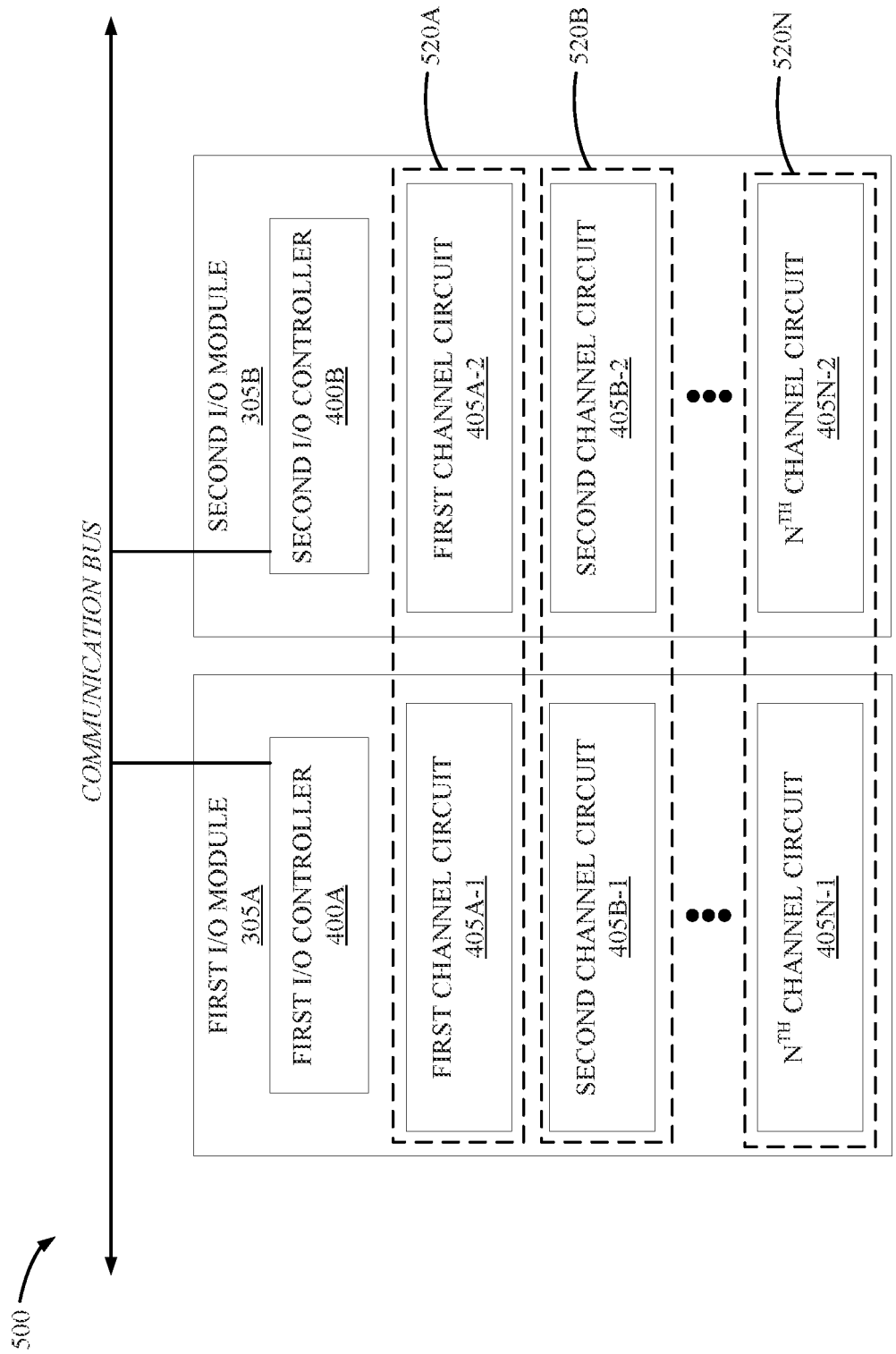
FIG. 5 schematically illustrates two I/O modules in a duplex configuration according to some configurations.

As noted above, in some configurations, the industrial system 115 may include multiple I/O modules 305 in a duplex configuration. When operating in a duplex configuration, the I/O modules 305 may include one or more partner or shared channel circuits 405 (as a channel circuit pairing). For example, FIG. 5 illustrates an example duplex configuration 500 that includes a first I/O module 305A and a second I/O module 305B. The first I/O module 305A includes a first I/O controller 400A and a set of channel circuits, including a first channel circuit 405A-1, a second channel circuit 405B-1, and an Nth channel circuit 405N-1. The second I/O module 305B includes a second I/O controller 400B and a set of channel circuits, including a first channel circuit 405A-2, a second channel circuit 405B-2, and an Nth channel circuit 405N-2.

In some configurations, at least one channel circuit of the first I/O module 305A and at least one channel circuit of the second I/O module 305B may form a channel circuit pairing. For example, as illustrated in FIG. 5, the first channel circuit 405A-1 of the first I/O module 305A and the first channel circuit 405A-2 of the second I/O module 305B may form a first channel circuit pairing 520A, the second channel circuit 405B-1 of the first I/O module 305A and the second channel circuit 405B-2 of the second I/O module 305B may form a second channel circuit pairing 520B, and the Nth channel circuit 405N-1 of the first I/O module 305A and the Nth channel circuit 405N-2 of the second I/O module 305B may form an Nth channel circuit pairing 520N.

As noted above, the I/O controller 400 (e.g., the first I/O controller 400A and the second I/O controller 400B) may control a power state of each channel circuit 405 included in the I/O module 305. In some configurations, as noted herein, the industrial system 115 may include redundant I/O modules, such as illustrated in FIG. 5. In such configurations, the first I/O controller 400A and the second I/O controller 400B may coordinate control of the first I/O module 305A and the second I/O module 305B (e.g., via the communication bus as illustrated in FIG. 5). Alternatively, in some configurations, the first I/O controller 400A and the second I/O controller 400B may be configured as a single I/O controller 400 that controls each redundant I/O module (e.g., the first I/O module 305A and the second I/O module 305B).

In some configurations, the I/O controller 400 (e.g., the first I/O controller 400A, the second I/O controller 400B, or a combined I/O controller) may control how a current load is balanced (or cycled) between multiple redundant channel circuits (e.g., channel circuits included in a channel circuit pairing). Accordingly, in some configurations, the I/O controller 400 may control which I/O module 305 (e.g., which channel circuit of a channel circuit pairing) sources power. In some configurations, the I/O controller 400 may cycle (or transfer) power sourcing between I/O modules 305 (e.g., channel circuits thereof) as part of a fault detection process. For instance, in some configurations, the I/O controller 400 may cycle power in response to detecting a fault.

Figure 6A:
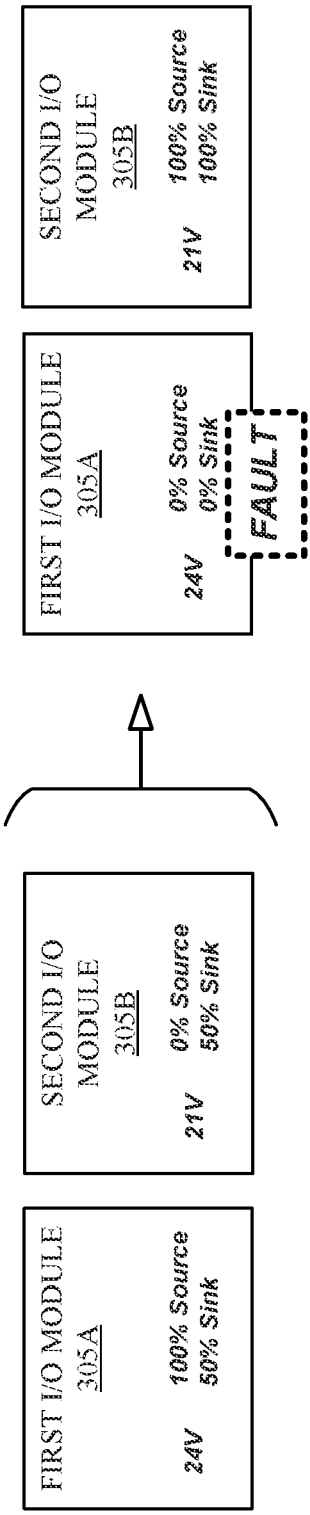

For example, FIGS. 6A-6B illustrate example fault scenarios according to some configurations. FIG. 6A illustrates an example fault scenario according to some configurations. As illustrated in FIG. 6A, the I/O controller 400 cycles power from a channel circuit included of the first I/O module 305A to a corresponding channel circuit of the second I/O module 305B in response to detecting a fault with the first I/O module 305A. In the illustrated example of FIG. 6A, during normal operation, the I/O controller 400 may control the first I/O module 305A (e.g., the first channel circuit 405A-1) to source 100% of the power. When the I/O controller 400 detects a fault with the first I/O module 305A (e.g., the first channel circuit 405A-1), the I/O controller 400 may cycle power from the first I/O module 305A (e.g., the first channel circuit 405A-1) to the second I/O module 305B (e.g., the first channel circuit 405A-2). FIG. 6B illustrates another example fault scenario according to some configurations. As illustrated in FIG. 6B, the I/O controller 400 cycles power from the second I/O module 305B (e.g., the first channel circuit 405A-2) to the first I/O module 305A (e.g., the first channel circuit 405A-1) in response to detecting a fault with the second I/O module 305B (e.g., the first channel circuit 405A-2). In the illustrated example of FIG. 6B, during normal operation, the I/O controller 400 may control the second I/O module 305B (e.g., the first channel circuit 405A-2) to source 100% of the power. When the I/O controller 400 detects a fault with the second I/O module 305B (e.g., the first channel circuit 405A-2), the I/O controller 400 may cycle power from the second I/O module 305B (e.g., the first channel circuit 405A-2) to the first I/O module 305A (e.g., the first channel circuit 405A-1).

In some configurations, when the I/O controller 400 cycles power from a faulty channel circuit of a channel circuit pairing to a different channel circuit of the channel circuit pairing, the sinking of the faulty channel circuit may be adjusted (e.g., decreased). For example, as illustrated in FIG. 6A, during normal operation, the first I/O module 305A (e.g., the first channel circuit 405A-1) may be sinking 50%. However, when a fault is detected, the first I/O module 305A (e.g., the first channel circuit 405A-1) may be sinking 0%. Similarly, as illustrated in FIG. 6B, during normal operation, the second I/O module 305B (e.g., the first channel circuit 405A-2) may be sinking 50%. However, when a fault is detected, the second I/O module 305B (e.g., the first channel circuit 405A-2) may be sinking 0%.

Alternatively, or in addition, in some configurations, the I/O controller 400 (e.g., the first I/O controller 400A, the second I/O controller 400B, or a combined I/O controller) may detect faults and perform a response action, such as, e.g., attempt a recovery internally (e.g., internal to the software or hardware), control the system to enter a safe state and alert the user to a needed repair, or the like. A safe state may refer to a predefined "safe" operation of software that is triggered or executed when a fault or error is detected. In such a safe state, the software may continue to operate (e.g., in a minimal capacity) as defined by the predefined "safe" operation. For example, a user may configure each channel as an Analog Output type. Following this example, when one of the channels fails, the safe state may include turning the power off to the failed channel and sending an alert to the user. Thus, a user may take action to correct an external fault and attempt restart the failed channel.

Accordingly, in some configurations, the I/O controller 400 may perform power balancing and imbalance detection techniques, current loading control techniques (e.g., controlling the timing of current loading between redundant channel circuits), and the like. As one example, the I/O controller 400 can set an output power on each channel circuit 405 such that the sum of the power on a screw terminal is the same (or similar) as the commanded output. As another example, the I/O controller 400 may perform a diagnostic that checks for imbalance between redundant channel circuits 405. As another example, the I/O controller 400 may ensure that power settings for both channel circuits are within tolerance.

Accordingly, in some configurations, the I/O controller 400 may detect hardware faults, software faults, or a combination thereof. As one example, when an output of the first channel circuit 405A is supposed to measure 40% of the commanded current and an output of the second channel circuit 405B measures 60%, then if the output of the first channel circuit 405A divided by the output of the second channel circuit 405B is not within 1.5+/− of a tolerance, then a fault has occurred. In some configurations, embedded software monitors can also detect latent faults by changing voltage/current levels without impacting user process control. In some configurations, when this imbalance cannot be detected with respect to a specific channel circuit as having the fault (e.g., the first channel circuit 405A or the second channel circuit 405B), the I/O controller 400 may control the system to enter a safe state by ramping down the power on both redundant channel circuits, issuing a warning or alert to a user (e.g., for display on the display device 270 of the user device 110), and waiting for a user to repair the fault.

With respect to timing of current loading, when a current load is commanded to an I/O module 305, the I/O controller 400 may facilitate the transition from the present loading value to the new commanded value specification to operate within a specific time. When the I/O controller 400 (e.g., the firmware) keeps a high enough resolution measurement of time, the I/O controller 400 can measure readback current values to detect the transitions of the power level. When either the ramp rate of the power or the calculated balance of power is off, then the I/O controller 400 (via the embedded firmware) can command one or the other redundant channel circuits to a safe state. Accordingly, in some configurations, the technology disclosed herein may enable detection of power balance faults based on a detected ramp up or ramp down during the transition of power from one I/O module to anther I/O module. As one example, a pair of I/O modules (or channel circuits thereof) may ramp a first channel circuit up from 50% sinking to 75% sinking and the partner channel circuit down from 50% sinking to 25% sinking. In some configurations, such ramping up/down may enable detection of "stuck-at" faults with less disruption than, e.g., a typical partial pulse test.

Figure 7:
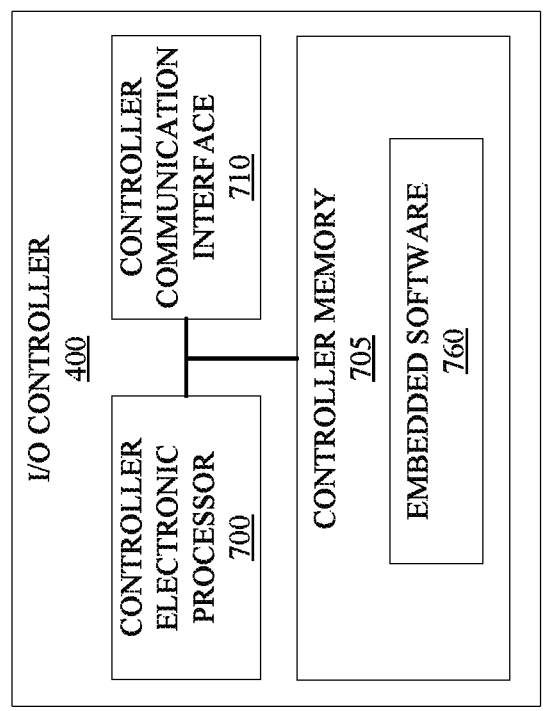
FIG. 7 schematically illustrates an example I/O controller of the I/O module of FIG. 4 according to some configurations.

In some configurations, as illustrated in FIG. 7, the I/O controller 400 may include a controller electronic processor 700 (e.g., a microprocessor, an ASIC, or another suitable electronic device), a controller memory 705 (e.g., a non-transitory, computer-readable storage medium), and a controller communication interface 710, as similarly described above with respect to the user device 110 of FIG. 2. As illustrated in FIG. 7, the controller memory 705 may include embedded software 760 (e.g., a control program). The embedded software 760 is software executable by the controller electronic processor 700. The controller electronic processor 700 may execute the embedded software 760 to control a power state of one or more channel circuits 405 of the I/O module 305 (e.g., one or more communication channels 305). Alternatively, or in addition, the controller electronic processor 700 may execute the embedded software 760 to perform power balancing and imbalance detection techniques, current loading control techniques (e.g., controlling the timing of current loading between redundant circuit channels), other fault detection techniques or tasks, and the like.

Figure 8:
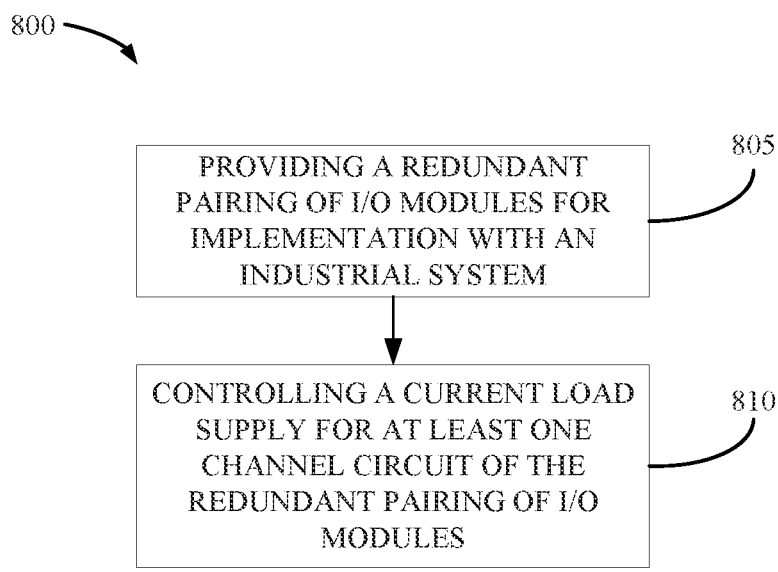
FIG. 8 is a flowchart illustrating a method for providing fault detection for I/O modules of industrial systems using the system of FIG. 1 in accordance with some configurations.

FIG. 8 is a flowchart illustrating a method 800 of providing fault detection for I/O modules having redundant channel circuits (e.g., the first I/O module 305A, the second I/O module 305B, the first channel circuit 405A-1, and the first channel circuit 405A-2) according to some configurations. As illustrated in FIG. 8, the method 800 includes providing a redundant pairing of I/O modules (e.g., the first I/O module 305A and the second I/O module 305B of FIG. 5) for implementation with an industrial system (e.g., the industrial system 115) (at block 805). The method 800 then includes controlling a current load supply for at least one channel circuit 405 of the redundant pairing of I/O modules (e.g., the first I/O module 305A and the second I/O module 305B) (at block 810).

In some configurations, a controller electronic processor (e.g., the controller electronic processor 700) of one I/O module included in the redundant pairing may receive current load data associated with one or more channel circuits 405 (e.g., information indicating an imbalance between redundant I/O modules 305). For instance, in some examples, a controller electronic processor associated with the first I/O module 305A may receive current load data associated with one or more channel circuits included in the first I/O module 305A (e.g., the first channel circuit 405A-1, the second channel circuit 405B-1, etc.). Alternatively, or in addition, in some configurations, the controller electronic processor associated with the first I/O module 305A may receive current load data associated with one or more channel circuits 405 included in the second I/O module 305B (e.g., the first channel circuit 405A-2, the second channel circuit 405B-2, etc.). In such configurations, the controller electronic processor associated with the first I/O module 305A may receive the current load data from the second I/O module 305B (e.g., a controller electronic processor of the second I/O module 305B). Accordingly, as noted herein, the I/O controllers 400 (e.g., the first I/O controller 400A and the second I/O controller 400B) may communicate (e.g., via the communication bus) such that the first I/O controller 400A and the second I/O controller 400B may coordinate control of the first I/O module 305A and the second I/O module 305B (e.g., control a power state of one or more channel circuits 405 of the redundant pairing).

Based on the current load data, the controller electronic processor 700 may detect a fault associated with the I/O module 305 based on the current load data (as described in greater detail herein). In some configurations, the controller electronic processor 700 may control the current load supply for at least one channel circuit in response to detecting the fault. As one example, in some configurations, the controller electronic processor 700 may control the current load supply by increasing a current load supply for at least one of the channel circuits of the plurality of channel circuits. Alternatively, or in addition, in some configurations, the controller electronic processor 700 may execute (or initiate) a safe state for the I/O module and generate and transmit an alert to a user (as described in greater detail herein).

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, the system comprising:
   industrial control equipment configured to execute a manufacturing process;
   a first input/output ("I/O") module including a first channel circuit, the first I/O module configured to establish a first communication interface with the industrial control equipment;
   a second I/O module including a second channel circuit, the second I/O module configured to establish a second communication interface with the industrial control equipment; and
   an electronic processor configured to control sourcing of power to the industrial control equipment via at least one of the first communication interface of the first I/O module or the second communication interface of the second I/O module such that the industrial control equipment executes the manufacturing process.

2. The system of claim 1, wherein the first channel circuit and the second channel circuit form a redundant channel circuit pairing that shares a current load.

3. The system of claim 1, wherein the electronic processor is configured to control the sourcing of power in response to detecting a current load imbalance between the first I/O module and the second I/O module.

4. The system of claim 1, wherein the electronic processor is further configured to:
   receive current load data associated with the first channel circuit and the second channel circuit; and
   detect a fault associated with the first I/O module or the second I/O module based on the current load data, and
   wherein the electronic processor controls the sourcing of power in response to detecting the fault.

5. The system of claim 4, wherein, when the fault is associated with the first I/O module, the electronic processor controls the sourcing of power by:
   transferring power sourced to the industrial control equipment from the first I/O module to the second I/O module; and
   turning power sourced via the first I/O module off.

6. The system of claim 4, wherein, when the fault is associated with the second I/O module, the electronic processor controls the sourcing of power by:
   transferring power sourced to the industrial control equipment from the second I/O module to the first I/O module; and
   turning power sourced via the second I/O module off.

7. The system of claim 4, wherein the electronic processor is further configured to:
   execute a safe state for the first I/O module and the second I/O module by ramping down power for the first I/O module and the second I/O module, and
   generate and transmit an alert to a user device for display via a display device.

8. A method, the method comprising:
   receiving, with an industrial controller, current load data for a set of redundant I/O modules, wherein the current load data represents a present current load provided to industrial control equipment via the set of redundant I/O modules, the set of redundant I/O modules including a first redundant I/O module having a first channel circuit and a second redundant I/O module having a second channel circuit, the first channel circuit and the second channel circuit forming a redundant channel circuit pairing such that a commanded current for the industrial control equipment is shared between the first channel circuit and the second channel circuit;
   determining, with the industrial controller, a current load imbalance between the first channel circuit and the second channel circuit based on the current load data; and
   in response to the current load imbalance, controlling, with the industrial controller, a current load supply to at least one of the first channel circuit or the second channel circuit such that the industrial control equipment receives the commanded current in order to execute a manufacturing process using the commanded current.

9. The method of claim 8, wherein controlling the current load supply includes sourcing power to the industrial control equipment via the second channel circuit when the current load imbalance is associated with the first channel circuit and turning power sourced via the first channel circuit off.

10. The method of claim 8, wherein controlling, with the industrial controller, the current load supply includes sourcing power to an industrial system via the first channel circuit when the current load imbalance is associated with the second channel circuit and turning power sourced via the second channel circuit off.

11. The method of claim 8, further comprising:
    executing, with the industrial controller, a safe state for the set of redundant I/O modules, and
    generating and transmitting, with the industrial controller, an alert to a user device for display via a display device.

12. The method of claim 11, wherein executing, with the industrial controller, the safe state for the set of redundant I/O modules includes decreasing power to the set of redundant I/O modules.

13. A system, the system comprising:
    a plurality of channel circuits configured to establish one or more communication interfaces with industrial control equipment of an industrial system configured to execute a manufacturing process, wherein the plurality of channel circuits includes a first channel circuit included in a first I/O module and a second channel circuit included in a second I/O module, the first channel circuit and the second channel circuit forming a redundant channel circuit pairing such that the first channel circuit and the second channel circuit share a commanded current load for the industrial control equipment; and
    an electronic processor communicatively coupled to each channel circuit of the plurality of channel circuits via a dedicated hardware communication channel, the electronic processor configured to control a current load supply to at least one of the first channel circuit or the second channel circuit such that the industrial control equipment receives the commanded current load causing execution of the manufacturing process.

14. The system of claim 13, wherein, in response to detecting a fault associated with the first channel circuit, the electronic processor controls the current load supply by transferring power from the first channel circuit to the second channel circuit such that the second channel circuit provides the commanded current load to the industrial control equipment.

15. The system of claim 13, wherein the electronic processor is configured to control the current load supply in response to detecting a current load imbalance associated with the plurality of channel circuits.

16. The system of claim 13, wherein the electronic processor is further configured to:
   receive current load data associated with the plurality of channel circuits,
   detect, based on the current load data, a fault associated with the plurality of channel circuits, and
   in response to detecting the fault, control the current load supply to at least one of the first channel circuit or the second channel circuit.

17. The system of claim 16, wherein the electronic processor is further configured to:
   execute a safe state for the plurality of channel circuits, and
   generate and transmit an alert to a user device for display.

18. The system of claim 17, wherein the electronic processor is configured to execute the safe state by decreasing power to the plurality of channel circuits.

* * * * *